Patented Nov. 24, 1931                                              1,833,062

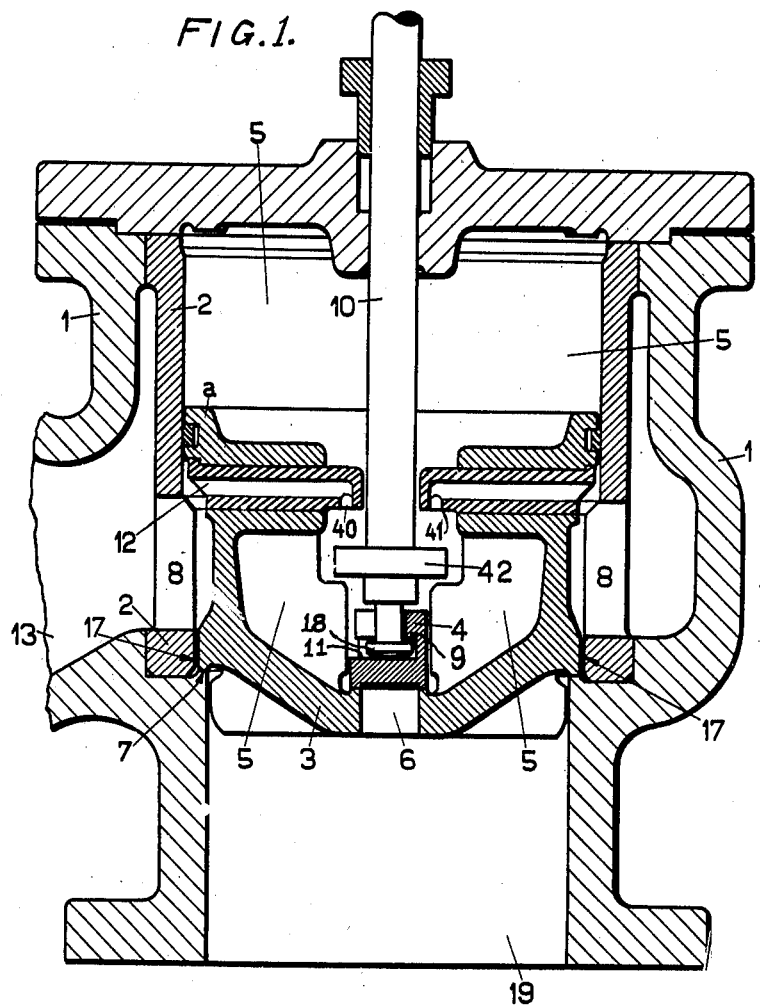

UNITED STATES PATENT OFFICE

FRITZ WAGNER, OF BERLIN-LICHTERFELDE, GERMANY, ASSIGNOR TO FIRM OF FRITZ WAGNER AND CO., OF BERLIN, GERMANY

VALVE COMPRISING AN EQUALIZING CHAMBER, A MAIN AND AN AUXILIARY VALVE

Original application filed June 17, 1926, Serial No. 116,643, and in Germany May 22, 1926. Divided and this application filed January 19, 1927. Serial No. 162,123.

My invention relates to valves comprising an equalizing chamber, a main and an auxiliary valve, as described for instance in my co-pending application Serial No. 116,643, now Patent No. 1,659,846, of which this application is a division, and it is an object of my invention to simplify a valve of this type.

In the valve referred to, the passage which connects the fluid supply and the equalizing chamber, comprises an annular restriction surrounding the valve spindle in co-axial relation, the free area of which restriction is regulated by a piston or the like on the valve spindle.

The simplification referred to is effected by eliminating the coaxial restriction and providing instead not less than one restriction which is arranged eccentrically with respect to the axis of the valve spindle.

By these means, the necessity of exactly machining the walls of the restriction, the valve spindle and the piston which cooperates with the restriction, and of providing a cage defining an intermediate chamber in the body of the main valve, as in the type referred to, is eliminated.

My novel valve is much simplified, its initial and maintenance costs are reduced in proportion, and its reliability is increased, as compared with the prior type.

In the drawings a valve embodying my invention is illustrated by way of example.

Figure 1 is an axial section of the valve, and

Fig. 2 shows a portion of the liner of the valve.

1 is the valve casing, 2 is a liner inserted in the casing, 3 is the main valve, a is a piston at the upper end of the main valve which fits the liner, 7 is the seat of the main valve in the casing 1, 4 is the auxiliary valve which is seated above a passage 6 in the bottom of the main valve 3, 5 is the equalizing chamber which is constituted partly by the casing above the piston a and partly by the cavity of the main valve body, 19 is the delivery pipe below the seat 7 of the main valve, 10 is the spindle of the auxiliary valve which projects from a stuffing box in the cover of the casing 1, and 13 is the fluid inlet pipe. The spindle 10 has a collar 18 at its lower end which is adapted to move with some play between two checks 9 and 11 on the auxiliary valve. By these means, the auxiliary valve 4 is free to assume any position with respect to its spindle 10 and the collar 18 in radial direction, that is, to rotate about the axis of the spindle. The steam flowing past the auxiliary valve has a tendency to impart rotation to it. If the valve were closely fitted on the spindle it could not follow but would engage its seat invariably in the same position while as it rotates it may vary its position on the seat and one-sided wear is eliminated.

Fluid under pressure, for instance, steam, from the pipe 13 is admitted to tubes, hollow members, or nozzles 12 in the body of the main valve, which, in the embodiment illustrated, are shown as tubes through ports 8 in the liner 2. The tubes or hollow members 12 are inserted in arms of the main valve body so that their inner ends project from such arms toward the spindle 10, and are flattened at 41 on the lower faces of the projecting ends, the flat faces 41 extending in a plane at right angles to the axis of the spindle 10, and 40 are perforations in the flat faces 41 which extend parallel to the axis of the spindle. 42 is a dog or collar secured on, or made integral with, the spindle 10. The upper face of dog 42 which is parallel to the flat faces 41 at the lower side of tubes 12, is so positioned on the spindle 10 with respect to the seating face of the auxiliary valve 4 that when the auxiliary valve is on its seat in the main valve 3 above the opening 6, the distance from the upper face of dog 42 to the faces 41 is greater than ¼ of the inside diameter of opening 6. This will appear from Fig. 1.

In the vicinity of the seat 7 for the main valve 3 the inner diameter of the casing 1, or, in the example illustrated, of the liner 2, near the seat 7 of the main valve 3, and the outer diameter of the main valve, are so determined as to define a narrow clearance 17 above the main-valve seat 7.

The operation of my valve is as follows:

The diameter of the main valve 3 being larger at its upper end where the piston $a$ is formed, than at its lower or seating end, an annular face is formed by the piston $a$. When the main and auxiliary valves are seated as shown in Fig. 1, steam or other fluid under pressure flowing from pipe 13 into the liner 2 through the ports 8 exerts a lifting force on the annular face below the piston $a$ and flows into the equalizing chamber 5 through the hollow tubes 12 and their perforations 40. The pressures in 5 and 13 are equal, and when the two valves are closed two forces will result as follows:

I. An upward force or lift on the annular face below the piston $a$;

II. A downward or seating force, being the proper weight of the main valve 3 plus the steam pressure on the face of the valve which is open to the equalizing chamber 5.

The lift (I) is constant because the pressure on the annular face is constant. The area of this face is so determined that the lift is in excess of the weight of the main valve.

The seating force (II) is variable. It undergoes a very considerable reduction by the falling of the pressure in equalizing chamber 5 which occurs immediately upon the opening of auxiliary valve 4. The steam from the equalizing chamber 5 flows into the delivery pipe 19 through opening 6 but at the same time the loss of pressure is partly balanced by the fresh steam from openings 40 in the hollow tubes 12. This make-up prevents the pressure in the equalizing chamber 5 from falling so low that the seating force (II) becomes less than the lifting force (I), and so the main valve remains closed for the present. But if the auxiliary valve 4 is opened still further by the spindle 10, the upper face of the dog 42 on the spindle 10 throttles increasingly the flow from 40 into the chamber 5 so that the pressure in this chamber is further reduced. As soon as, in consequence of this reduction, the seating force (II) has become less than the lift (I) the excess of the lift causes the main valve to open.

A second upward force is generated as soon as the main valve is opened by the steam flowing past the seat of the main valve and this additional lift accelerates the velocity imparted to the main valve by the excess of lift beyond the velocity at which the spindle 10 moves up.

However, the clearance 17 is narrow, and therefore the quantity of steam flowing past the seat of the main valve 3 is so small that its acts substantially only on the seating face of the main valve but not on the entire area of the main valve. Moreover, the additional lift disappears almost immediately because after a short lifting of the main valve the area it exposes on the seat 7, is larger than the clearance 17. On account of the particular configuration of the ports 8, Fig. 2, the exposed area during the further lifting of the main valve remains invariably larger than the openings from which steam flows toward the valve seat 7. It follows that the additional lift acts only momentarily on the main valve and its acceleration is rapidly made up for by the counter force generated by the accelerated main valve.

For generating this counter force, the perforations 40 in the hollow tubes 12 and the dog 42 cooperate. By the inevitable short acceleration of the main valve as it opens the distance between the faces 41 and the dog 42 is increased, fresh steam flows into the equalizing chamber 5 in increasing quantities and builds up pressure therein until the seating force overcomes the lift. The excess seating force rapidly reduces to zero the velocity of the upward movement of the main valve and enforces return movement of such valve. This return movement begins already before the main valve 3 has moved so near to the auxiliary valve 4 that the auxiliary valve throttles its opening 6. This opening, therefore, remains unobstructed notwithstanding the temporary upward acceleration of main valve 3. As the main valve 3 returns toward its seat 7 it reduces the distance between the faces 41 on the hollow tubes 12 and the dog 42 and increasingly throttles the flow of fresh steam from the perforations 40. the excess seating force being reduced until the lift overcomes the seating force again and the valve moves further away from its seat 7. This operation occurs during a very small stroke of the main valve, and when the seating force has been overcome the lift moves up the main valve at the velocity of the spindle 10 as long as this velocity is constant. Any variation of the spindle velocity will reduce or increase the distance between the dog 42 and the faces 41. The excess lift is reduced or increased to the amount required for equalizing the velocities of the spindle 10 and the main valve 3. This equalizing occurs practically at the same time as the variation of the spindle velocity.

If the spindle 10 descends it removes the dog 42 from the faces 41 of the hollow checks 12 which results in an excess of seating force moving the main valve 3 toward its seat 7 at the velocity of the spindle 10. Variations in the relative velocity of the spindle and the main valve are equalized during the downstroke of the spindle in the same manner and as rapidly as during its upstroke.

It follows that the velocity of the main valve is equal to the velocity of the spindle in both directions. In other words, the main valve moves as long as the spindle moves, is arrested with the spindle and restarted in the same direction and at the same velocity as the spindle as soon as the spindle resumes its movement in upward or downward direction.

The main valve, through the medium of the throttling devices at 17 and at 41, 42, which cooperate, is connected to the spindle in a manner which is equivalent to positive connection.

This operation of applicant's valve is unique and is not found in any other valve. It absolutely prevents chattering of the main valve alternately on its seat 7 and against the auxiliary valve 1 which occurs in all other balanced valves.

I claim:

1. A valve comprising a casing; means for supplying fluid under pressure to said casing; a liner in said casing; an equalizing chamber; a main valve in said liner; a seat for said main valve in said casing, said liner having openings extending upwards from the vicinity of said seat which are of smaller area at their lower than at their upper ends, and the inner diameter of said liner and the outer diameter of said main valve being so determined as to define a clearance near said seat; an auxiliary valve in said casing; a spindle operatively connected with said auxiliary valve; a hollow member in said main valve adapted to connect said fluid-supplying means with said equalizing chamber and having a perforation; and a dog on said spindle adapted to throttle at a steadily increasing rate the fluid issuing from said perforation in said member.

2. A valve comprising a casing; means for supplying fluid under pressure to said casing; an equalizing chamber; a main valve and an auxiliary valve in said casing; a spindle operatively connected with said auxiliary valve; a hollow member in said main valve adapted to connect said fluid-supplying means with said equalizing chamber and having a perforation; a face on said member surrounding said perforation and extending at right angles to the axis of said spindle; and a dog on said spindle having a face extending parallel to said face on said member and adapted to throttle at a steadily increasing rate the fluid issuing from said perforation in said member.

3. A valve comprising a casing, means for supplying fluid under pressure to said casing, an equalizing chamber, a main valve and an auxiliary valve in said casing, a pair of checks on said auxiliary valve, a spindle, a collar on said spindle adapted to engage one of said checks at a time, a hollow member in said main valve adapted to connect said fluid-supplying means with said equalizing chamber and having a perforation, and a dog on said spindle adapted to throttle at a steadily increasing rate the fluid issuing from said perforation in said member.

4. A valve comprising a casing; means for supplying fluid under pressure to said casing; an equalizing chamber; a main valve and an auxiliary valve in said casing; a seat for said main valve in said casing, the inner diameter of said casing and the outer diameter of said main valve being so determined as to define a clearance near said seat; a spindle operatively connected with said auxiliary valve; a tube in said main valve adapted to connect said fluid-supplying means with said equalizing chamber and having a perforation; and a dog on said spindle adapted to throttle at a steadily increasing rate the fluid issuing from said perforation.

5. A valve comprising a casing; means for supplying fluid under pressure to said casing; an equalizing chamber; a main valve and an auxiliary valve in said casing; a spindle operatively connected to said auxiliary valve; a tube in said main valve adapted to connect said fluid-supplying means with said equalizing chamber and having a perforation; and a dog on said spindle adapted to throttle at a steadily increasing rate the fluid issuing from said perforation, the face of said dog which cooperates with said tube being so arranged with respect to the seating face of said auxiliary valve that the distance of said face from said tube in the seating position of said auxiliary valve is greater than ¼ of the inside diameter of the opening in said main valve which said auxiliary valve controls.

6. A valve comprising a casing; means for supplying fluid under pressure to said casing; an equalizing chamber; a main valve and an auxiliary valve in said casing; a spindle operatively connected with said auxiliary valve; a tube in said main valve adapted to connect said fluid-supplying means with said equalizing chamber and having a perforation extending parallel to the axis of said spindle; and a dog on said spindle adapted to throttle at a steadily increasing rate the fluid issuing from said perforation.

In testimony whereof I affix my signature.

FRITZ WAGNER.